United States Patent [19]

Barnes et al.

[11] Patent Number: 4,988,211

[45] Date of Patent: Jan. 29, 1991

[54] PROCESS AND APPARATUS FOR CONTACTLESS MEASUREMENT OF SAMPLE TEMPERATURE

[75] Inventors: Sharon J. Barnes; James W. Beutnagel; Russel T. Mack, all of Lake Jackson; Aaron A. Mills, Sweeny; John Smith, III, Freeport, all of Tex.

[73] Assignee: The Dow Chemical Company, Midland, Mich.

[21] Appl. No.: 344,326

[22] Filed: Apr. 27, 1989

[51] Int. Cl.⁵ .................... G01J 5/02; G01F 15/02
[52] U.S. Cl. .................................. 374/121; 128/736; 128/771; 374/150
[58] Field of Search .............. 374/120, 121, 130, 123, 374/124, 150; 250/342

[56] References Cited

U.S. PATENT DOCUMENTS

| | | | |
|---|---|---|---|
| 3,781,504 | 12/1973 | Harnden, Jr. | 374/121 X |
| 4,343,182 | 8/1982 | Pompei | 374/123 X |
| 4,568,201 | 2/1986 | Noda | 374/120 X |
| 4,614,441 | 9/1986 | Wolf | 374/130 |
| 4,634,294 | 1/1987 | Christol et al. | 374/130 X |

Primary Examiner—Daniel M. Yasich
Attorney, Agent, or Firm—W. J. Lee

[57] ABSTRACT

The present invention includes a process and apparatus for determining the temperature of a sample such as urine without contacting the sample itself. A portable device is used to carry the temperature measuring apparatus. The sample of urine is placed in a plastic container on an adjustable support and the temperature is measured by an infrared pyrometer.

6 Claims, 2 Drawing Sheets

PROCESS AND APPARATUS FOR CONTACTLESS MEASUREMENT OF SAMPLE TEMPERATURE

BACKGROUND OF THE INVENTION

This invention relates to an apparatus and method for determining temperature of a specimen such as urine. The present invention advantageously uses an infrared thermometer for measuring temperature without contacting the sample being measured.

Generally, it is known to take temperature measurements of samples by inserting a thermometer into a container with the sample therein or taking the surface temperature of the container by means of a contact-type instrument such as a thermometer or a thermocouple. Such procedures are undesirable because the sample is usually contaminated with the thermometer contacting the sample and surface temperature readings are usually inaccurate and results are not reproducible.

For example, in procedures for testing urine for foreign substances such as drugs, a need arose for accurately determining the temperature of the urine sample without contacting the sample prior to such urine samples being subjected to analysis. The temperature measurement of urine is critical for determining whether the urine is at or near a person's body temperature and to determine if the urine specimen is fresh or stale so that subsequent testing of the urine is credible.

Heretofore, there has been no method and means for testing temperatures of urine samples accurately and without contacting the urine. Prior art methods of measuring the temperature of urine samples included inserting a thermometer into the urine sample contained in a sample container. This method resulted in contamination of the urine sample.

Another known method used for determining temperature of a urine sample included taking the surface temperature of the container used to house the urine sample by contacting the container surface with a contact-type instrument such as a thermometer or a thermocouple. However, this type of measurement was inaccurate and not reproducible.

It is desired to provide a quick, safe, easy, precise and accurate method of determining the temperature of a sample material in a sample container without contacting the container or the sample material in the container.

SUMMARY OF THE INVENTION

One aspect of the present invention is directed to a process for determining the temperature of human body fluids and/or food products comprising:
(a) placing a sample a predetermined distance away from a temperature detecting means; and
(b) detecting said temperature without contacting the sample.

Another aspect of the present invention is an apparatus for determining the temperature of human body fluids and/or food products comprising:
(a) a base means for supporting a sample container and a means for measuring temperature;
(b) means for measuring temperature of sample within a sample container without contacting said sample within the sample container, said temperature measuring means releasably attached to said base means; and
(c) an individual sample container removably disposed on said base and disposed a predetermined distance spaced apart from said temperature measuring means, said container adapted for holding a sample.

DETAILED DESCRIPTION OF THE PREFERRED EMBODIMENT(s)

The present invention includes a process and apparatus for determining the temperature of samples of human body fluids and/or food products without contacting the sample itself.

Figure 1:
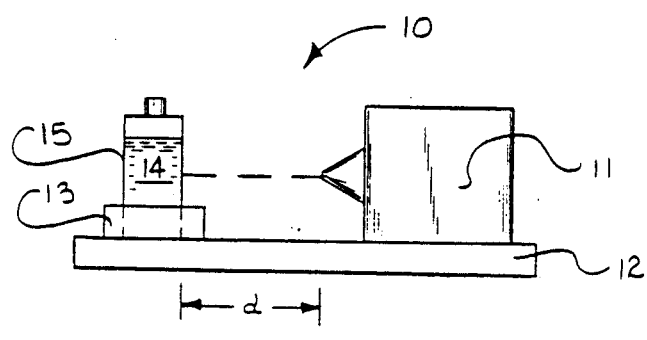
FIG. 1 is schematic view of an apparatus of the present invention.

In its broadest scope, one embodiment of the apparatus of the present invention, generally indicated in FIG. 1 as numeral 10, includes a temperature measuring means 11 attached to a base means 12 and a sample holding means 13 attached to the base means 12. The temperature measuring means 11 is used for measuring the temperature of a sample of human body fluids and/or food products 14 in a sample container 15 without contacting the sample 14. The sample holding means 13 with the sample container 15 positioned in the holding means 13 is a predetermined distance d from the temperature measuring means 11 so that when a plurality of samples are measured, the distance d is standardized.

The distance d may be any distance desired as long as the distance is within the focal range of the temperature measuring means 11 used and as long as the aspect ratio of the temperature measuring means 11 is such that the measuring spot is smaller than the sample being measured. Preferably, the distance d is less than a foot so that the apparatus of the present invention 10 may be portable.

Figure 2:
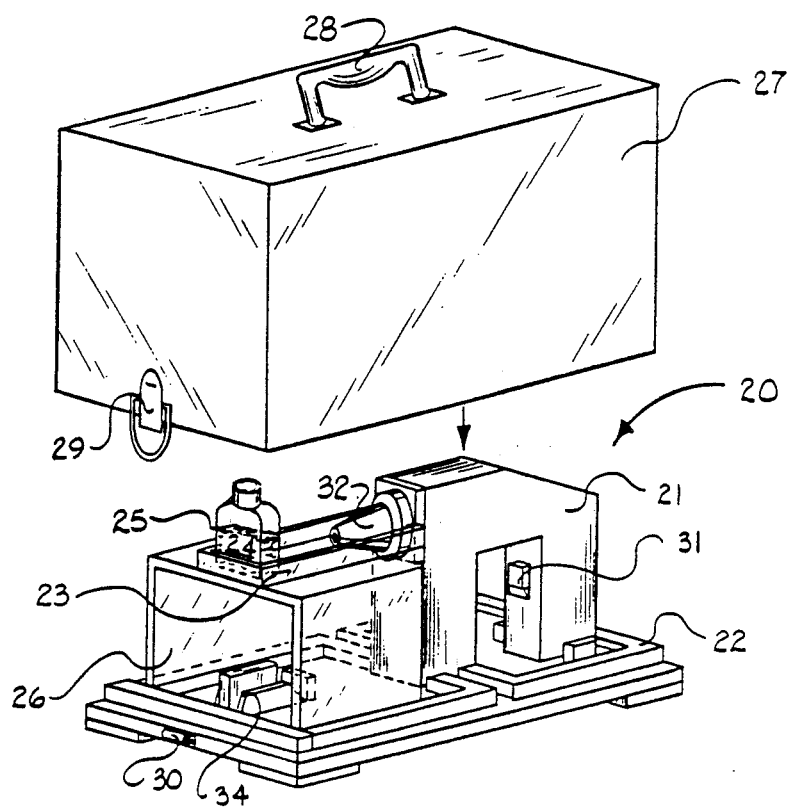
FIG. 2 is a perspective view showing one embodiment of the apparatus of the present invention.
Figure 3:
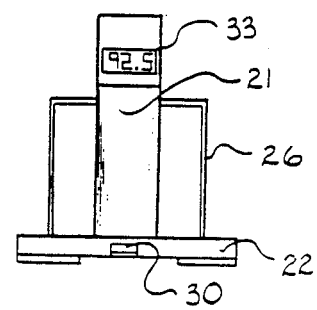
FIG. 3 is a back view of the apparatus of FIG. 2.

With reference to FIGS. 2 and 3, there is shown another embodiment of the apparatus of the present invention, generally indicated as numeral 20, and shown in more detail from the apparatus shown in FIG. 1. The apparatus 20, in this instance, includes a temperature detection means 21 attached to a support base structure 22 preferably integral with a sample container support structure 26, which in turn, is integral with a sample holding means 23 for holding a sample 24 in a sample container 25. The sample container 25, is removably set or positioned in the sample holding means 23 when a reading from the detection mean 21 is to be obtained. The apparatus 20 may contain a means (not shown) for permanently attaching the apparatus to a surface such as a laboratory table to provide for a stationary apparatus 20.

Optionally, the apparatus 20 is made portable by providing an enclosure or box 27 removably attached to said support base structure 22. The ease of transportation is facilitated by the use of a carrying handle 28 attached to the enclosure 27 and two draw straps 29 for locking the enclosure 27 onto the support base 22 by means of latches 30.

The enclosure 27, support base 22, sample support 23 and sample container support structure 26 can be of any material which does not affect the detection operation of the detector 21. Preferably, the elements 27, 22, 23, and 26 are made of a light weight material for ease of carrying the apparatus 20 and of a rigid material to add physical stability to the temperature measuring means 21. The material used for the construction of the elements 27, 22, 23 and 26 may be, for example, a plastic material such as Plexiglass ® (trademark of Rohm & Haas Co.). The enclosure 27 also serves to protect and to insulate the temperature measuring means 21.

Because the enclosure 27 is portable, temperature measurements can be acquired on-site and the apparatus 20 is not restricted to use in a permanent location. The apparatus 20 provides a portable, compact, accurate, simple method for temperature determination and may be used in a clinic, hospital, or other sample collection facility. The apparatus 20 is simple to operate and can be used without extensive training of operators.

The temperature detector means 21 does not contact the sample 24 or the sample container 25. The sample container 25 is placed a predetermined distance d away from a close focus accessory 32 of the defector means 21 in the sample container holding means 23. The close focus accessory 32 of the temperature detector means 21 aids in making the apparatus more compact and facilitates the repeatability of the temperature data generated by the apparatus 20.

The distance d used in the present invention may vary depending on the temperature measuring instrument 21 being used and is determined by the focal range of the detector means 21. The detector means 21 is preferably a temperature sensor means such as an infrared pyrometer. An infrared pyrometer 21 suitable for use in the present invention is a Raynger PM ®, a sensor manufactured and sold by Raytek, Inc. The infrared thermometer 21 is securely attached to the base 22 for stability, for standardizing a reading distance between a specimen container 25 and the infrared thermometer 21, and for ease of reading temperatures of the specimens 24.

The thermometer 21 contains a trigger mechanism 31 for activating the thermometer 21. Any object above absolute zero emits infrared radiant energy as a function of its surface emissivity and the fourth power of its absolute temperature. The specimen and container, 24 and 25, respectively, being normally between 551 and 559 degrees Rankine above absolute zero are an example of an infrared emitter. When specimen and container, 24 and 25, respectively, are placed in the predetermined position, in holder 23 and in front of thermometer 21, the trigger 31, is activated and infrared energy from the container 25 passes through the close-focus accessory 32. Almost instantaneously a reading of the temperature of the sample 24 is sensed by the detector of the thermometer 21 and indicated on the L.E.D. display 33.

While not shown in FIGS. 1-3, it is within the scope of the present invention to provide the apparatus 20 of the present invention with optional attachments such as an attachment, for example attached to the support base 22, for (1) carrying several sample bottles, (2) carrying an ac/dc adaptor for the detector means 21, (3) a portable computer means or devices for communicating with a computer means and the like. In addition, the detector means 21 may be pivotably attached to the support base 22 for directing the detector infrared radiation in a number of different direction. Further, a plurality of sample holding means 23 such as a sample tray with a number of slots for sample containers 25 can be incorporated in the apparatus 20 for measuring sequentially a number of samples in a short period of time.

In carrying out one embodiment of the present process, the thermometer 21 is first calibrated using a temperature source measured by a National Bureau of Standards calibrated thermometer. After the infrared thermometer 21 is calibrated, the unit is ready for actual testing. A specimen to be tested is placed in the specimen holding means or tray 23 of the apparatus 20. Spacer means 34, generally of rectangular shape and various thicknesses, may be used for adjusting the height of the specimen bottle 25 on the support 26, particularly when the volume of a simple material in the container 25 is not at the same level as the optical path of the thermometer 21. The trigger 31 on the thermometer 21 is depressed and a temperature reading is taken and indicated on the display 33.

The container 25 used for holding the sample may include, for example, aluminum, lead, brass, carbon, graphite, zinc, ice, cloth, asbestos, asphalt, basalt, carorundum, ceramic, clay, concrete, glass, gravel, gypsum, limestone, paint, paper, plastic, rubber, sand, snow, soil, water, and natural wood.

Any material that is not transparent to the infrared radiation within the band of the detector means 21 can be measured. The materials whose temperature can be measured include, for example, human body fluids such as urine, synovial fluid, blood, blood products and the like, and liquid or solid food products, particularly perishable food products such as milk, meat, fruit, vegetables and the like.

The emissivity value for the sample material to be measured and the container thereof may vary. For example, the emissivity for metal applications may be 0.1 and the emissivity for nonmetal applications may be 0.9. The emissivity for urine in a plastic container should be set at 0.95+/−0.01. The emissivity values for various materials are formed in ASHRAE Handbook, 1977 Fundamentals, Table III "Properties of Solids", Chapter 37, page 3, American Society of Heating, Refrigerating and Air Conditioning Engineers, Inc., NY, NY, 1978.

When using the apparatus of the present invention for urine temperature readings, the time that lapses from the time a specimen is put into a sample container until time the specimen is tested is preferably minimized to minimize an inaccurate reading. It is evident to those skilled in the art that the amount and rate of air currents in a facility or room and ambient conditions of the room or facility can affect heat losses associated with the samples. Therefore, the lapse time for a sampling procedure may vary with different enviroments. Preferably, for a more accurate determination of the initial sample temperature during urine temperature measurements, the time lapse from the time a specimen is put into a sample container until time the specimen is tested should not be more than five minutes.

The preferred range of temperature of the measured urine sample should be from about 89 to about 96 degrees F. as set by the mean and range of over 200 adult urine samples measured.

The present invention saves both time and money because of the ease of operation. The present invention also requires one individual to operate the apparatus 20 and thus is efficient in terms of manpower. The present invention also determines temperature reading with great accuracy and good reproducibility without complexity. The present invention, particularly, provides a novel, relatively simple method for obtaining urine temperatures which must be accurate. Furthermore, the apparatus of the present invention has the added advantage of being easily transportable to an on-site testing facility.

The present invention is illustrated further by the following example.

EXAMPLE

Preliminary Testing-Procedure A

Temperature readings were taken of 125 distilled water samples as follows: The temperature readings were taken of each of the 125 samples with both a Raynger PM ®, an infrared thermometer commercially available from Raytek, Inc. and a thermometer with a calibration traceable to National Bureau of Standards (NBS) (herein referred to as "NBS thermometer"). The NBS thermometer is calibrated for taking temperature readings from 0 to 100 degrees centigrade.

Warm distilled bottled water was placed in a plastic sample container and mixed with cold water to bring the temperature of the water to a temperature of about 96–98 degrees Fahrenheit. Each of the 125 samples consisted of about 50–60 cubic centimeters (cc) of the warm distilled water in the plastic sample container.

The temperature readings were taken with the NBS thermometer by opening the cap of the sample container and inserting the NBS thermometer into the water sample and reading the temperature indicated by the NBS thermometer. Then, immediately after each reading with the NBS thermometer, each of the specimens was recapped and then placed a distance of three inches from the front end of a focus accessory of the Raynger PM and the temperature readings of the 125 samples were taken with the Raynger PM. The readings obtained with the Raynger PM and the NBS thermometer were then compared.

The temperature readings taken with the Raynger PM and the NBS thermometer were found to be substantially the same, i.e., the temperatures taken by each instrument were within 1 degree F. of each other.

Preliminary Testing-Procedure B

The temperature readings of a 118 distilled water samples in a capped plastic container initially at about 96–97 degrees F. were taken, one at a time, with a Raynger PM at one minute intervals until the temperature of the sample was about 88 degrees F. Another 118 water samples in an uncapped plastic container initially at about 96–97 degrees F. were taken, one at a time, with a Raynger PM and a NBS thermometer. Temperature readings were taken simultaneously of capped and uncapped specimens to compare temperature loss for a specified period of time of a sample after the sample is collected. The ambient temperature ranged between about 72–74 degrees Fahrenheit and did not affect the temperature measurements.

Figure 5:
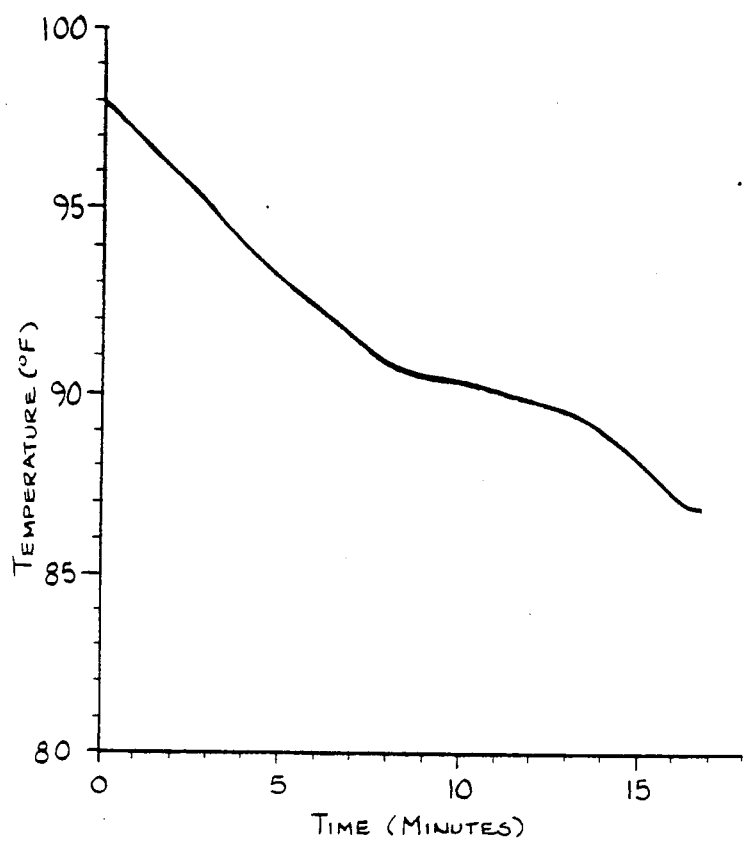
FIG. 5 is a graphical illustration showing heat loss of an individual specimen by plotting temperature versus time.

FIG. 5 shows temperature readings obtained for samples over a specific time interval. FIG. 5 shows temperature decline from 98° F. to about 87° F. within about 15 minutes of collection. The greatest rate of temperature decline will occur at the start of temperature collection and then will decrease as sample temperature approaches ambient conditions.

Urine Temperature Readings

Urine samples were provided by 205 adult individuals. Each sample consisted of about 50–60 cc of urine in a plastic container which was capped. The temperature readings of 205 urine specimens were collected by placing the specimen a distance of three inches from the front end of the focus accessary of the Raynger PM and the temperature readings of the samples were taken with the Raynger. The Raynger was activated by depressing the trigger mechanism on the Raynger and the temperature reading was indicated on the Raynger's L.E.D. display. The instrument had a capability of repeating a reading within seconds of a first reading by depressing the trigger mechanism on the Raynger.

In small thicknesses, both the plastic of the container and the urine sample itself are semitransparent to infrared radiation. However, the thickness of the bottle is sufficient that the full bottle is essentially opaque to infrared. The temperature indicated on the instrument is actually an integrated average temperature between the outside surface of the container and the urine a short distance inside the wall. Because the thin plastic is not a good insulator, and because the outside temperature is only about 20° colder than the urine, this effect produces little error. The emissivity is set somewhat arbitrarily at 0.95, but could be adjusted slightly to provide best agreement with the NBS thermometer.

A "normal temperature range" of urine for adults was determined as follows: Data points from the temperature readings taken by the Raynger were entered into a computer with a statistical quality control program. Then, the program determined a mean and a lower and upper limit which were established as the "normal range" as shown in FIG. 4.

Figure 4:
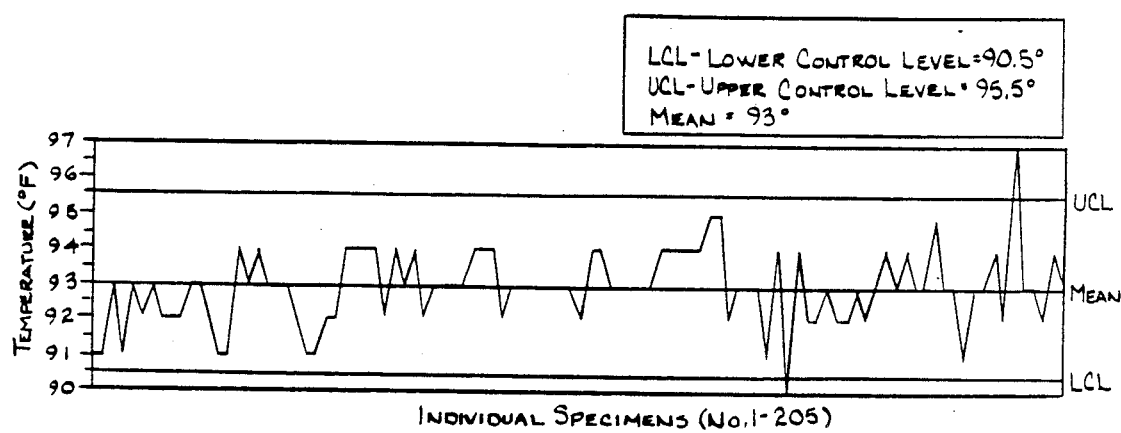
FIG. 4 is a graphical illustration showing temperature of individual specimens of urine in chart form.

FIG. 4 is a run chart plotting the temperatures of each individual sample prepared by the computer-assisted statistical quality control program. This procedure was utilized to locate and graph those point deviations which might warn of those temperatures that exceed tolerance of acceptable readings. Of the 205 sample temperature readings taken, there were two abnormal (out of range) temperature readings and the remainder of the 205 samples temperature readings fell in the normal range category of 90.5 to 95.5 degrees F.

As shown in FIG. 4, the temperature distribution range shows lower and upper control limits for data points. Only two points fall outside the "normal" range of data points for the other 203 specimens.

The foregoing description of the drawings and the example explain and illustrate a particular embodiment of the present invention, but the invention is not intended to be limited thereto except by the scope of the appended claims. Those skilled in the art who have the present disclosure before them will be able to make changes and variations therein without departing from the spirit and scope of the invention disclosed herein.

What is claimed is:

1. A process for determining the temperature of a human body fluid sample or food product sample comprising:
   (a) placing a sample, contained in a sample holder, a predetermined distance away from, and in the focal path of, an infrared temperature detecting means having a close focus means; and
   (b) detecting said temperature of said human body fluid sample or food product sample with said temperature detecting means without contacting the sample by measuring the infrared rays emitting from said sample, and reading the temperature on an L.E.D. display which is actuated by the infrared detecting means.

said infrared detecting means having been calibrated to take into account the emissivity values of the said sample and sample holder whereby the reading on the L.E.D. display reflects the calibrated emissivity value.

2. The process of claim 1 wherein the sample is urine.

3. The process of claim 1 including calibrating said detector to measure a sample of urine.

4. A portable apparatus for determining the temperature of an individual human body fluid sample or an individual food product sample comprising:

(a) a base means having attached thereto a support means for supporting a sample container, said container being adapted for holding said individual sample, in operable alignment with a means for measuring temperature and displaying the temperature;

(b) said means for measuring temperature being an infrared detecting device which is operable for measuring the temperature of said human body fluid sample or food product sample within said sample container without contacting said sample within the sample container, said temperature measuring means being releasably attached to said base means; and (c) said individual sample container being removably disposed on said support means supported by said base and having means for adjusting the height of said sample in relation to the temperature measuring means, said sample container disposed a predetermined distance spaced apart from said temperature measuring means.

5. The apparatus of claim 4 wherein the sample is urine.

6. The apparatus of claim 4 wherein the apparatus is in a portable housing means.

* * * * *